US011859409B2

(12) United States Patent
Xiang et al.

(10) Patent No.: US 11,859,409 B2
(45) Date of Patent: Jan. 2, 2024

(54) CONTROL METHOD OF ELECTRONIC LOCK AND ELECTRONIC LOCK BASED ON THE SAME

(71) Applicant: WENZHOU YEEKA LOCK TECHNOLOGY CO., LTD., Wenzhou (CN)

(72) Inventors: Wenguang Xiang, Wenzhou (CN); Qianxing Li, Wenzhou (CN); Yanyi Zhou, Wenzhou (CN)

(73) Assignee: WENZHOU YEEKA LOCK TECHNOLOGY CO., LTD., Wenzhou (CN)

( * ) Notice: Subject to any disclaimer, the term of this patent is extended or adjusted under 35 U.S.C. 154(b) by 691 days.

(21) Appl. No.: 16/977,482

(22) PCT Filed: May 10, 2019

(86) PCT No.: PCT/CN2019/086454
§ 371 (c)(1),
(2) Date: Sep. 2, 2020

(87) PCT Pub. No.: WO2019/214727
PCT Pub. Date: Nov. 14, 2019

(65) Prior Publication Data

US 2021/0002922 A1 Jan. 7, 2021

(30) Foreign Application Priority Data

May 11, 2018 (CN) ......................... 201810447253.1
May 11, 2018 (CN) ......................... 201820699103.5

(51) Int. Cl.
*E05B 47/00* (2006.01)

(52) U.S. Cl.
CPC .... *E05B 47/0003* (2013.01); *E05B 2047/005* (2013.01); *E05B 2047/0067* (2013.01); *E05B 2047/0081* (2013.01); *E05B 2047/0088* (2013.01); *E05Y 2201/462* (2013.01); *E05Y 2400/32* (2013.01); *E05Y 2400/40* (2013.01); *E05Y 2900/132* (2013.01)

(58) Field of Classification Search
CPC ............. E05B 47/0004; E05B 47/0003; E05B 47/0657; E05B 1/0092; E05B 2047/0086; E05B 2047/0088; E05B 2047/0067; E05B 2047/005; E05B 2047/0081; E05Y 2400/40; E05Y 2400/32; E05Y 2201/462; E05Y 2900/132
USPC ............................................................ 70/280
See application file for complete search history.

(56) References Cited

FOREIGN PATENT DOCUMENTS

WO WO-2017124825 A1 * 7/2017 ........... E05B 1/0092

* cited by examiner

*Primary Examiner* — Suzanne L Barrett

(57) ABSTRACT

Disclosed are a control method for an electronic lock and an electronic lock based on the control method. The electronic lock has a simple structure, and jointly control a snap hole on the handle with a telescopic body of the electromagnet located on the lock body base and a push rod controlled by the unlock mechanism. The telescopic body of the electromagnet has the characteristics of self-holding function when power off through the first permanent magnet, which not only the hidden danger of illegal unlocking through mechanical structure is solved, but also the power consumption of electronic lock in preventing illegal lock opening can be greatly reduced. The market's technical requirements for electronic locks can be met, and high promotion value can be obtained.

14 Claims, 8 Drawing Sheets

CONTROL METHOD OF ELECTRONIC LOCK AND ELECTRONIC LOCK BASED ON THE SAME

CROSS-REFERENCE TO RELATED APPLICATION

This application claims priority to Chinese Patent Application No. 2018104472531, filed on May 11, 2018, titled "ELECTRONIC LOCK CONTROL METHOD AND ELECTRONIC LOCK BASED ON THE SAME", and claims priority to Chinese Patent Application No. 2018206991035, filed on May 11, 2018, titled "ELECTRONIC LOCK USING SNAP HOLE FOR CONTROL", both of which are hereby incorporated by reference in their entities.

TECHNICAL FIELD

The present disclosure relates to an electronic lock, in particular, to a control method of an electronic lock and an electronic lock based on the control method.

BACKGROUND

With the development of information technology, industrial cabinets with various electrical equipment have been widely used; and with the application of various cabinet-type electronic locks. Chinese Patent Application Publication No. CN 107143208A, titled "Slider Avoidance Mechanism and Its Restricted Opening Electronic Lock" lists an industrial cabinet electronic lock that realizes key control through the slider avoidance mechanism, which relies on a motor to drive the slider. And through a plurality of photoelectric sensor switches to sense the position of the slider, when the power supply fails, the electric power stored in the capacitor on the circuit board will make the motor to move the slider to release the control of the key, so as to realize automatic unlocking and key control.

However, in this lock, the motor itself cannot operate stably and reliably, and the photoelectric sensor switch must be kept in working condition. The electronic lock itself consumes high daily power, and when its electronic control system fails, it is very likely that the motor cannot be controlled to open the electronic lock, resulting in the desired abnormality unlocking function is invalid. There are extremely high safety risks in popularization and application, and it is not suitable for application in industrial occasions. Therefore, there is a need for a new electronic lock structure to solve the requirement that the electronic lock cannot be opened with a mechanical key when the electronic lock is working normally.

SUMMARY

In order to overcome the above shortcomings, the purpose of the present disclosure is to provide a control method of an electronic lock and an electronic lock based on the control method in the art, so as to solve the above-mentioned technical problems existing in the existing electronic lock design. Its purpose is to be achieved through the following solutions.

A control method of an electronic lock, the electronic lock including a lock body, an unlock tool, an electromagnet and a first permanent magnet;

The electromagnet includes an electromagnetic coil, a telescopic body, and a force applying structure. When the electromagnetic coil is energized in the forward direction, the telescopic body can be driven to retract or the force applying structure can drive the telescopic body to retract. When the electromagnetic coil is energized in the reverse direction, the telescopic body is driven or driven jointly with the force applying structure to perform extension movements;

In the initial state, the electromagnet is in the power-off state or reversely energized state, and is extended and held by the telescopic body of the electromagnet, and the lock body is clamped by the telescopic body, or is clamped by a extended block connected to the telescopic body of the electromagnet, such that the lock body cannot be opened, and the electronic lock is in the locked state;

If the electronic lock obtains the unlock instruction and needs to be automatically opened, the electromagnet is supplied with forward power to retract the telescopic body, and the telescopic body or the extended block in the retracted state is absorbed by the first permanent magnet located in the lock body; the lock body being released from a locking state by the telescopic body or the extended block in the retracted state, so that the lock body is opened and the electronic lock is automatically opened;

If the unlock tool is used to unlock the lock, the unlock tool first couples the lock body so that the lock body cannot be opened; when the unlock action continues, the unlock tool pushes the telescopic body or the extended block to retract, and the coupled state of the lock body is released by the telescopic body or the extended block; during this process, the unlock tool keeps the coupled state on the lock body, and the lock body still cannot be opened; the following Step A, or B, or C are performed;

Step A: at this time, if the electronic lock has an electronic failure or an unlock instruction has been obtained, or the electronic lock has a unlock instruction for unlocking the anti-unlock tool, so that the electromagnet is in the power-off state or remains in the power-off state, the permanent magnet located in the lock body absorbs the telescopic body/the block in the retracted state; when the unlock tool further unlocks or performs a reverse unlock action, the locking state of the lock body is gradually released, and the telescopic body remains retracted; when the unlock tool completely releases the locking state of the lock body, the lock body is opened and the electronic lock is unlocked by the unlock tool;

Step B: if the electronic lock senses that the unlock action by the unlock tool is illegal, the electromagnet is supplied with reverse power, so that the first permanent magnet cannot absorb the telescopic body or the extended block in the retracted state; when the unlock tool further performs unlock action or reverse unlock action, and a coupled state of the lock body is gradually released, the telescopic body will extend and block the lock body with the action of the electromagnet, or the telescopic body will stretch out and join the action of the electromagnet. The lock body may be clamped by the block connected with the telescopic body; the following step D is executed;

Step C: if the electronic lock senses that the unlock action by the unlock tool is illegal; when the unlock tool further unlocks or performs a reverse unlock action, the coupled state of the lock body is gradually released. At this time, the unlock tool is released from the telescopic body or the extended block; when the unlock tool has not completely released the coupled state of the lock body, reverse power is supplied to the electromagnet, so that the first permanent magnet cannot absorb the telescopic body or the extended block in the retracted state, the telescopic body extends with the action of the electromagnet and clamps the lock body, or the telescopic body extends with the action of the electromagnet and may clamp the lock body with the block connected with the telescopic body; the following step D being executed; Step D: when the unlock tool completely releases the coupled state of the lock body, the lock body is still clamped by the telescopic body, the lock body cannot be opened, and the electronic lock prevents the unlock tool from illegally unlocking.

Preferably, the unlock tool includes a key, or a lock cylinder, or a knob, or a button, or a combination of a corresponding mechanical structure and the key or the lock cylinder or the knob or the button;

That if an unlock action is performed by the unlock tool, the unlock tool first coupling to the lock body so that the lock body cannot be opened refers to that when the unlock action is performed by the key, or the lock cylinder, or the knob, or the button, or the combination of the corresponding mechanical structure and the key or the lock cylinder or the knob or the button, the key, the lock cylinder, the knob, or the button, or the combination of the corresponding mechanical structure and the key or the lock cylinder or the knob or the button couples the lock body first, so that the lock body cannot be opened;

That then the unlock action is continued, the unlock tool pushing the telescopic body or the extended block to retract refers to that when the unlock action is performed by the key, or the lock cylinder, or the knob, or the button, or the combination of the corresponding mechanical structure and the key or the lock cylinder or the knob or the button, the movement of the key, the lock cylinder, the knob, or the button, or the combination of the corresponding mechanical structure and the key or the lock cylinder or the knob or the button pushes the telescopic body or the extended block to retract;

That when the unlock tool further performs the unlock action, or performs the reverse unlock action, the coupled state of the lock body being gradually released refers to that when through the further unlock action, or the reverse unlock action, the movement of the key, or the lock cylinder, or the knob, or the button, or the combination of the corresponding mechanical structure and the key or the lock cylinder or the knob or the button gradually releases the coupled state of the lock body.

Preferably, the forcing structure may be a telescopic body spring or a second permanent magnet; that the telescopic body is connected to the force applying structure body is that the telescopic body is connected to the telescopic body spring; when the telescopic body is in the retracted state, the telescopic body spring exerts a downward force on the telescopic body, and the telescopic body is composed of a material that can be absorbed by magnetic force; or that the telescopic body is connected to the force applying structure body is that the telescopic body is mounted with the second permanent magnet, the second permanent magnet repels a magnetism of the first permanent magnet when the telescopic body is in the extended state, and keeps the telescopic body in the extended state, when the telescopic body moves upward to the retracted state, the second permanent magnet generates a magnetic attraction with the first permanent magnet with a displacement relative to the first permanent magnet, so as to maintain the telescopic body in a retracted state.

An electronic lock based on the above control method of the electronic lock, the electronic lock includes a lock body, an unlock tool, an electromagnet installed in the lock body, and a first permanent magnet. The lock body includes a lock body base, a handle. The unlock tool includes an unlock mechanism composed of a key, or a lock cylinder, or a knob, or a button, and a corresponding mechanical structure composed of a push rod;

the electromagnet includes an electromagnetic coil, a telescopic body and a force applying structure, and the telescopic body may be placed in the telescopic body movable hole of the electromagnetic coil;

the handle may be provided with a snap hole, the snap hole may be an integral through hole, or may be divided into an upper snap hole matched with the telescopic body and a lower snap hole matched with the push rod;

when the electronic lock is closed on the lock body base, through the unlock tool is used to unlock the lock, the movement of the unlock mechanism drives the push rod to move up or down, and the push rod couples the handle so that the handle cannot be opened;

the electromagnet, the unlock mechanism and the push rod that moves under the control of the unlock mechanism may be installed in the lock body base; the push rod may be controlled by the unlock mechanism to move in the telescopic direction of the telescopic body; when the push rod moves relatively close to the telescopic body in the telescopic direction, it pushes the telescopic body in a extended state into the retracted state;

when the telescopic body in the extended state or the push rod in the extended state is located in the snap hole of the corresponding position on the handle, the handle is in a closed state; when the telescopic body in the retracted state and the push rods both are completely separated from the snap hole, the handle is in an open state; the first permanent magnet may be installed in the lock body base or in the electromagnet, for maintaining the retracted state when the telescopic body is retracted;

the force applying structure applies force to the telescopic body, and can maintain the extended state when the telescopic body is extended.

Preferably, a block may be connected to the lower end of the telescopic body of the electronic lock;

that when the telescopic body in the extended state or the push rod in the extended state is located in the snap hole of a corresponding position on the handle, the handle is in the closed state refers to that when the telescopic body in the extended state drives the block to extend, and then the block is stuck in the snap hole, the handle is in the closed state;

that when the telescopic body and the push rod in the retracted state are both completely separate from the snap hole, the handle being in the open state refers to that when the telescopic body in the retracted state drives the block to be retracted, and the push rod is also simultaneously separate from the snap hole, the handle is in the open state.

Preferably, the electronic lock further includes a reset tongue and a reset spring installed on the lock body base; when the handle is closed in the lock body base, the lower end of the reset tongue abuts on the inner wall of the handle or abuts on the outer wall of the snap hole. The reset spring located between the reset tongue and the lock body base is compressed or stretched; the reset tongue cooperates with the telescopic body, when the telescopic body is retracted and the handle is separated from the lock body base, the reset spring pushes the reset tongue to move the telescopic body downward.

Preferably, the reset tongue cooperates with the telescopic body, and when the telescopic body is in a high position and the handle is separated from the lock body base, the reset spring pushes the reset tongue to move the telescopic body downward; it means that the telescopic body movable hole is a through hole, when the telescopic body is retracted, its upper end passes out through the upper end of the telescopic body movable hole; when the handle is closed in the lock body base, the reset tongue does not affect the movement of the telescopic body; when the handle is separated from the lock body base, the reset tongue moves downward under the driving of the reset spring, and push the upper end of the telescopic body to move downward together, and the telescopic body extends;

or when the handle is closed in the lock body base, a part of the telescopic body outside the telescopic body movable hole of the electromagnetic coil is not affected by the reset tongue when the telescopic body is retracted; when the handle is separated from the lock body base, the reset tongue moves downward under the push of the reset spring, and pushes the part of the telescopic body outside the telescopic body movable hole to move downward together, and the telescopic body extends.

Preferably, the electronic lock further includes at least one sensor switch installed in the lock body base for sensing the unlocking operation using an unlock tool, and the sensor switch may be a touch switch, or an electromagnetic sensor switch, or a contact switch, or a light-sensitive response switch, or micro switch, or a combination of the above various switches;

the at least one sensor switch may be used to sense the unlocking operation using the unlock tool means that the one or more sensor switches sense an upward or downward movement of the push rod, or sense the upward or downward movement of the telescopic body, or sense the upward or downward movement of the reset tongue by the unlock tool or push rod, or sense the action that occurs when the unlocking key is inserted, the lock cylinder or the knob on the handle rotates, or sense the action that occurs when the button is pressed;

or the at least one sensor switch is used to sense the unlocking operation using the unlock tool means a state where after one or more sensor switches are triggered by the upward movement of the push rod or the reset tongue, one or more of the sensor switches are restored from being triggered to the state where they are not triggered during the descending movement of the push rod or reset tongue; or refers to a state where the upward movement of the push rod or the upward movement of the reset tongue which causes one or more of the sensor switches to be untriggered, then when the push rod or the reset tongue moves down, one or more of the sensor switches are triggered.

Preferably, the electronic lock further includes a control circuit board; the control circuit board may be connected to the electromagnetic coil and may be responsible for powering the electromagnetic coil in a forward or reverse direction; the control circuit board may be connected to the sensor switch and may be responsible for receiving the induction signal of the sensor switch. When the unlock tool performs an unlock action to trigger or de-trigger the sensor switch, the control circuit board determines whether the unlock action of the unlock tool is illegal, and if it is determined to be an illegal unlock action, the electromagnetic coil is energized in the reverse direction or maintains reverse energization, if it is determined to be a legal unlock action, the electromagnetic coil is energized in the forward direction or de-energized.

Preferably, one end of the handle may be movably connected to the lock body base, the snap hole may be located at the other end of the handle, and the handle can be opened about the connection with the lock body base as the axis; or the handle and the lock body base are completely separated.

Preferably, the unlock tool may be installed in the lock body base.

Preferably, the upper snap hole matched with the telescopic body and the lower snap hole matched with the push rod may be configured such that when the telescopic body is extended downward, it snaps into the upper snap hole, and when the push rod moves upward, it snaps into the lower snap hole. After the push rod moves upward, it retracts the telescopic body through other mechanical structures outside the lower snap hole.

Preferably, a buckle structure may be provided at the position where the lower end of the telescopic body and the upper end of the snap hole cooperate with each other.

Preferably, the electromagnet further includes an electromagnet frame, wherein the first permanent magnet may be located in the electromagnet frame, wherein the telescopic body movable hole may be constituted by the through hole of the electromagnetic coil, and the telescopic body may be made of iron core in the through hole. The force applying structure may be located between the electromagnet frame and the iron core and may be formed by an iron core spring.

The control method of the electronic lock and the electronic lock based on the control method of the present disclosure have a simple and reliable electronic lock structure. The unlock tool, the electromagnet and the first permanent magnet are used cleverly, and the unlock tool and the telescopic body of the electromagnet are used together to control the snap hole of the lock body, thereby realizing automatic unlocking and preventing illegal unlocking. At the same time, it has the purpose of unlocking the lock through the unlock mechanism when any electronic failure occurs; and through the unique control method, the low consumption of the power of the electronic lock can be further realized. The solution has high application value in the application of electronic locks.

REFERENCE NUMERALS

101, lock body base; 102, lock cylinder hole; 103, lock cylinder; 104, key; 105, push rod, 106, fix frame; 107, gear shaft; 108, gear movable block;
201, handle; 202, connecting shaft; 203, snap hole;
301, electromagnet frame; 302, electromagnetic coil; 303, iron core; 304, iron core spring, 305, first permanent magnet;
401, control circuit board; 402, sensor switch; 403, contact spring;
501. reset tongue; 502, reset lever; 503, reset spring.

DESCRIPTION OF THE EMBODIMENTS

The technical solutions in the embodiments of the present disclosure will be clearly and completely described below in combination with the accompanying drawings. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

In order to facilitate the understanding of the present disclosure, an electronic lock used in industrial occasions may be described below. It can be understood that the control method of an electronic lock and the electronic lock based on the control method of the present disclosure are not only limited to this type of industrial locks, but can also meet the demand in more occasions where electronic locks are used. This should not be regarded as a limitation to the present disclosure, but should fall within the protection scope of the present disclosure.

EMBODIMENT

Figure 1:
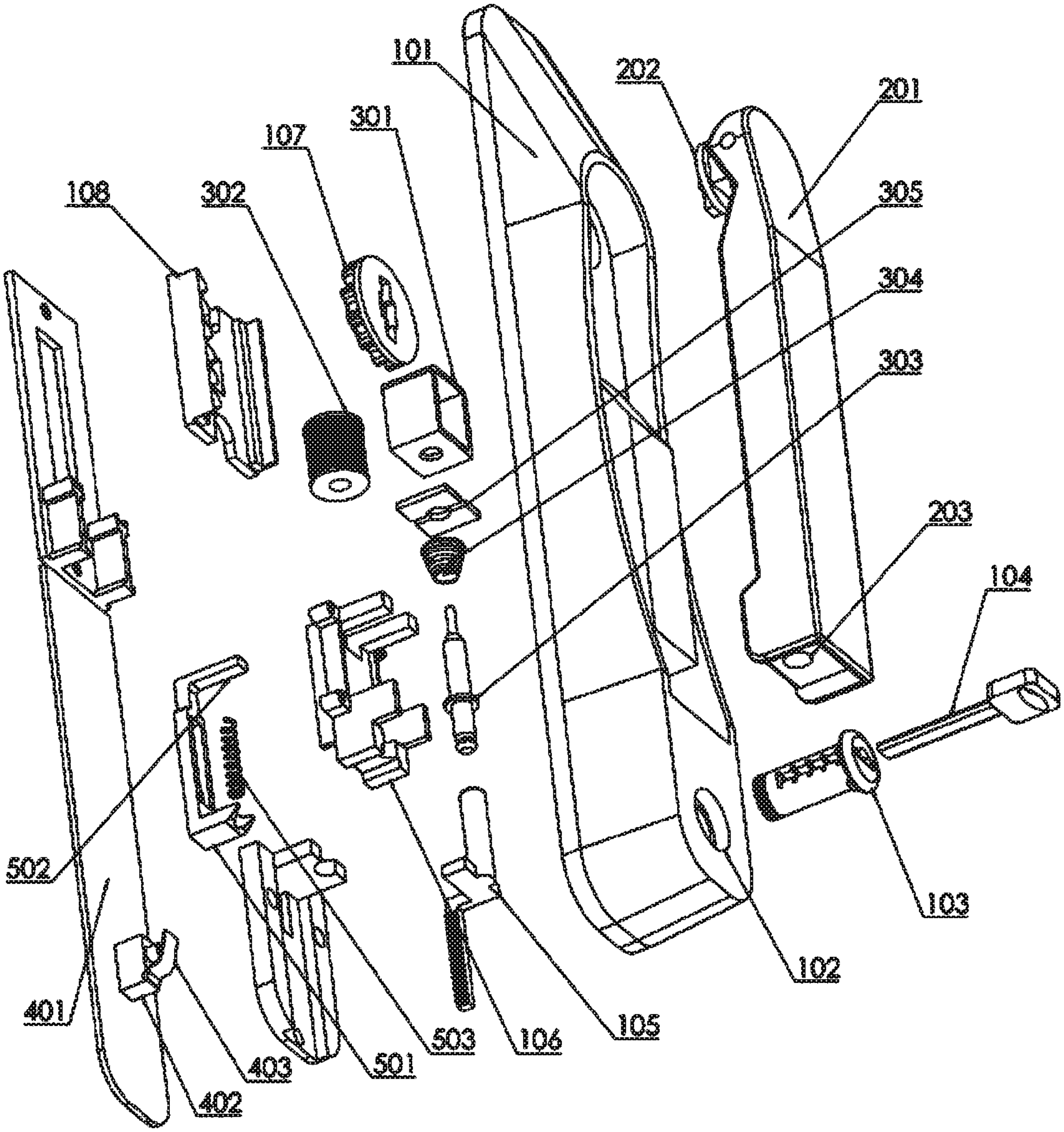
FIG. 1 is a schematic diagram of the explosive structure of a lock used in an industrial occasion in the present disclosure.
Figure 2:
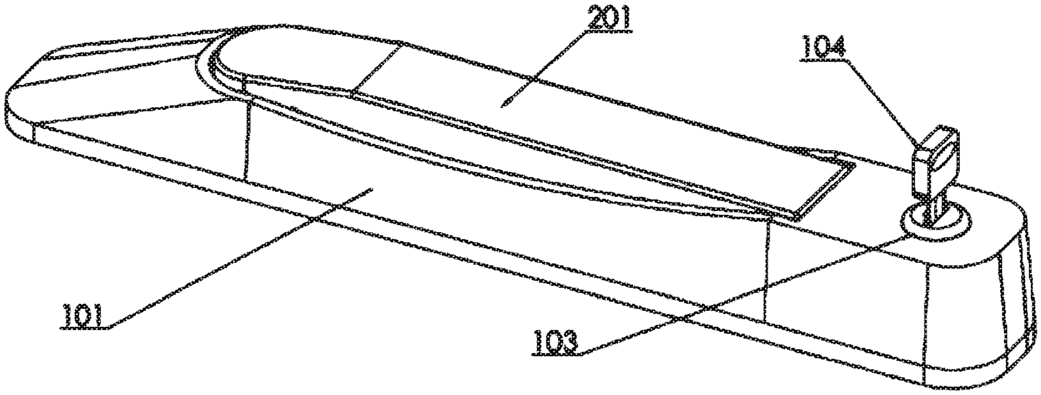
FIG. 2 is a schematic diagram of the overall structure of the lock in FIG. 1 when it is closed.
Figure 3:
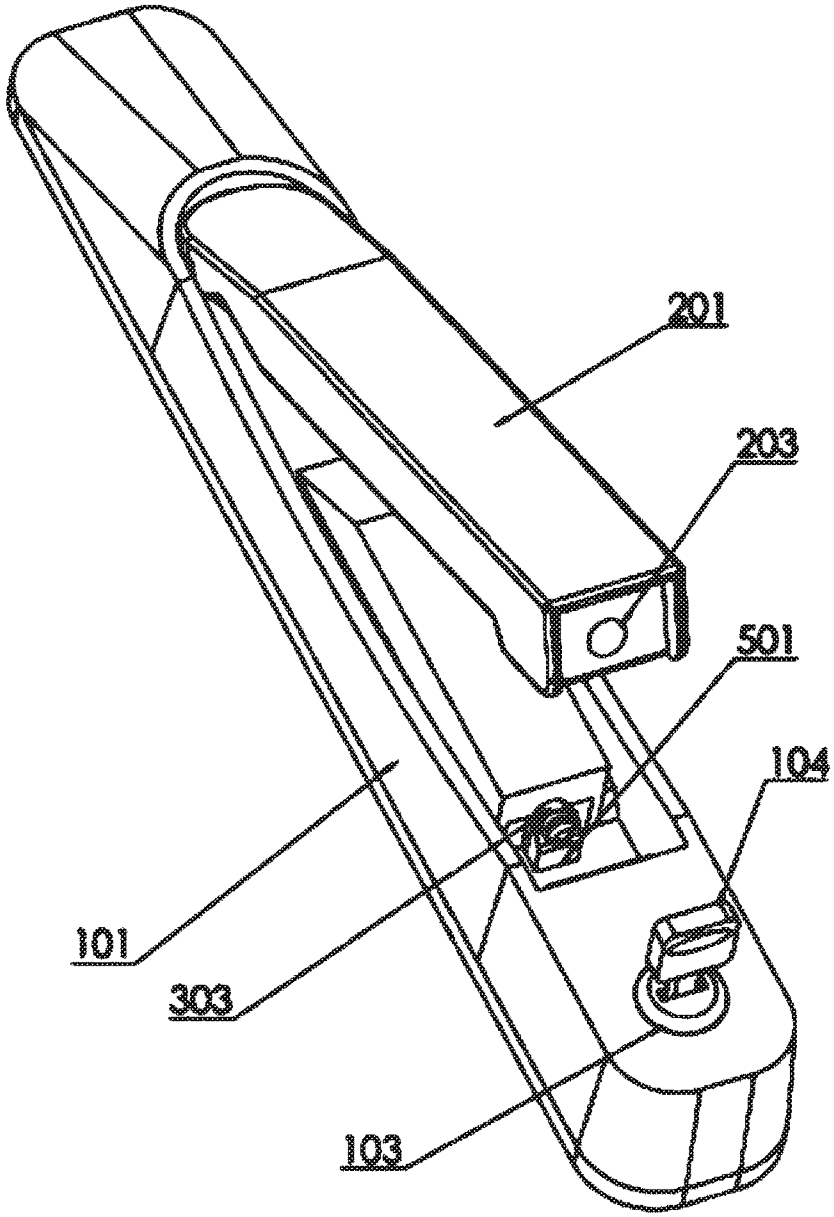
FIG. 3 is a schematic diagram of the overall structure of the lock in FIG. 1 when it is opened.
Figure 4:
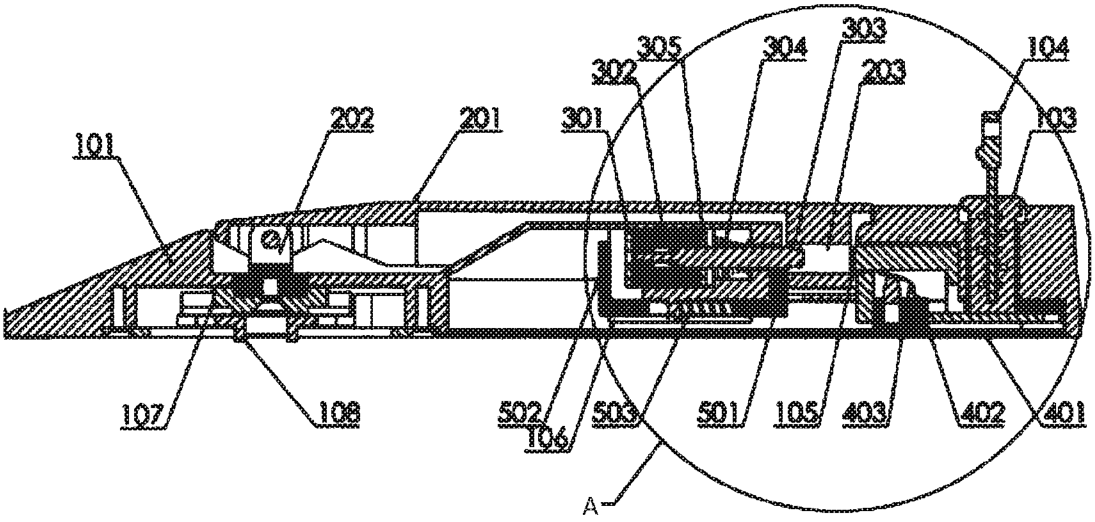
FIG. 4 is a schematic diagram of the internal structure of the lock in FIG. 2 when it is closed.
Figure 8:
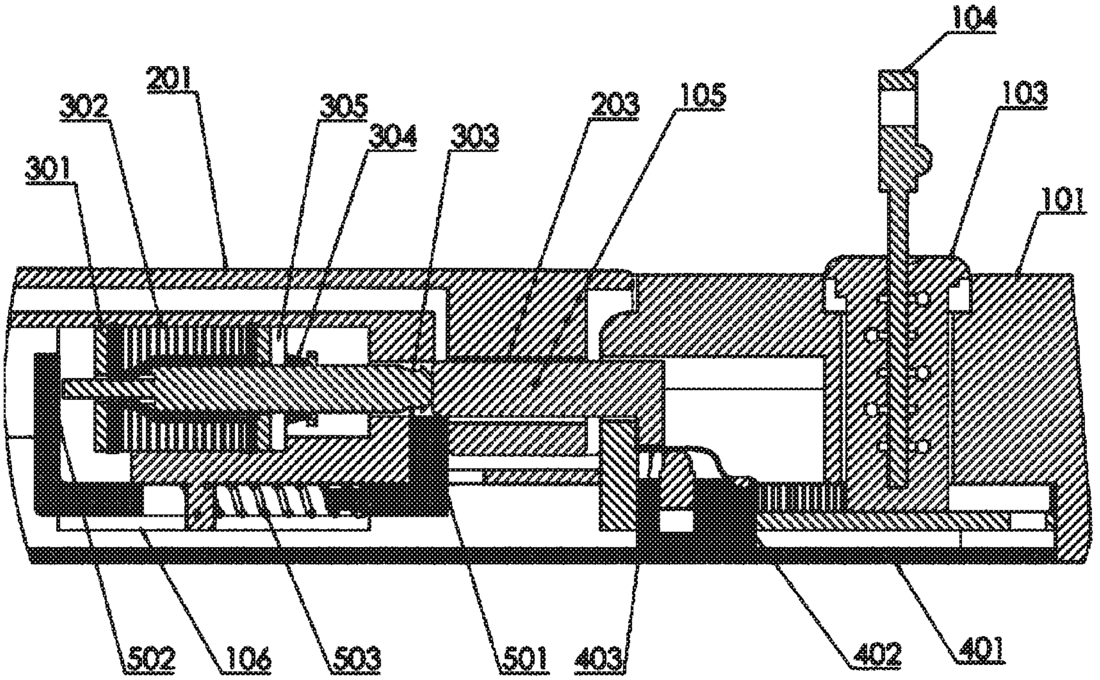
FIG. 8 is an enlarged schematic diagram of Part A when the push rod pushes the iron core to retract.
Figure 9:
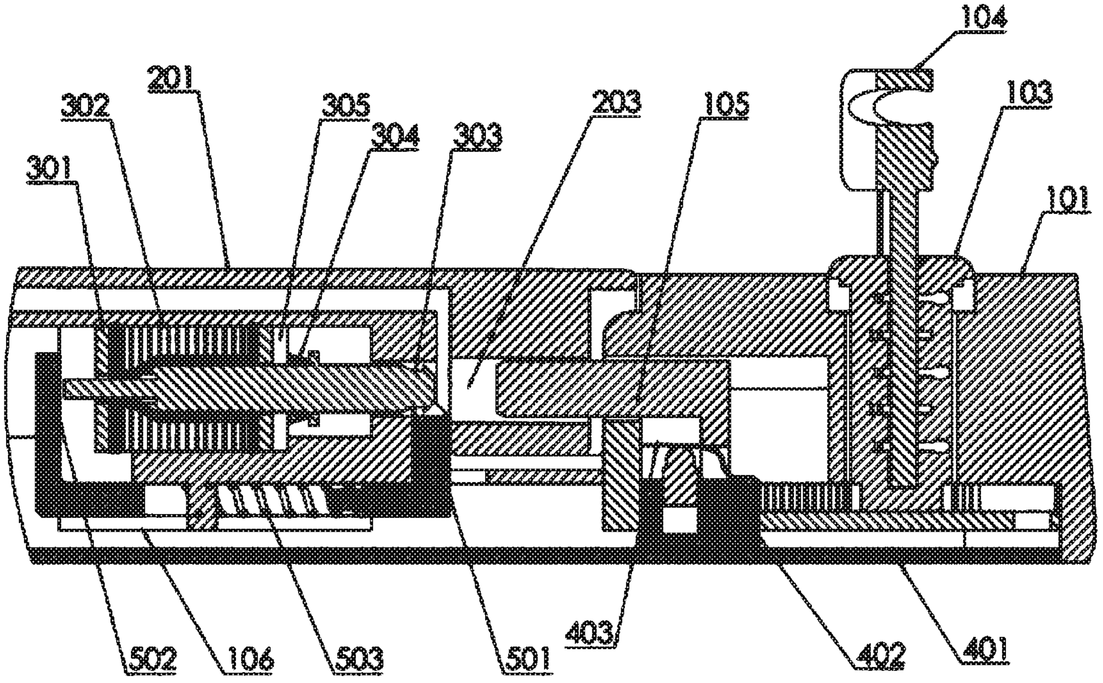
FIG. 9 is an enlarged schematic diagram of Part A when the push rod moving downward, the sensor switch is still triggered after the iron core is retracted.
Figure 10:
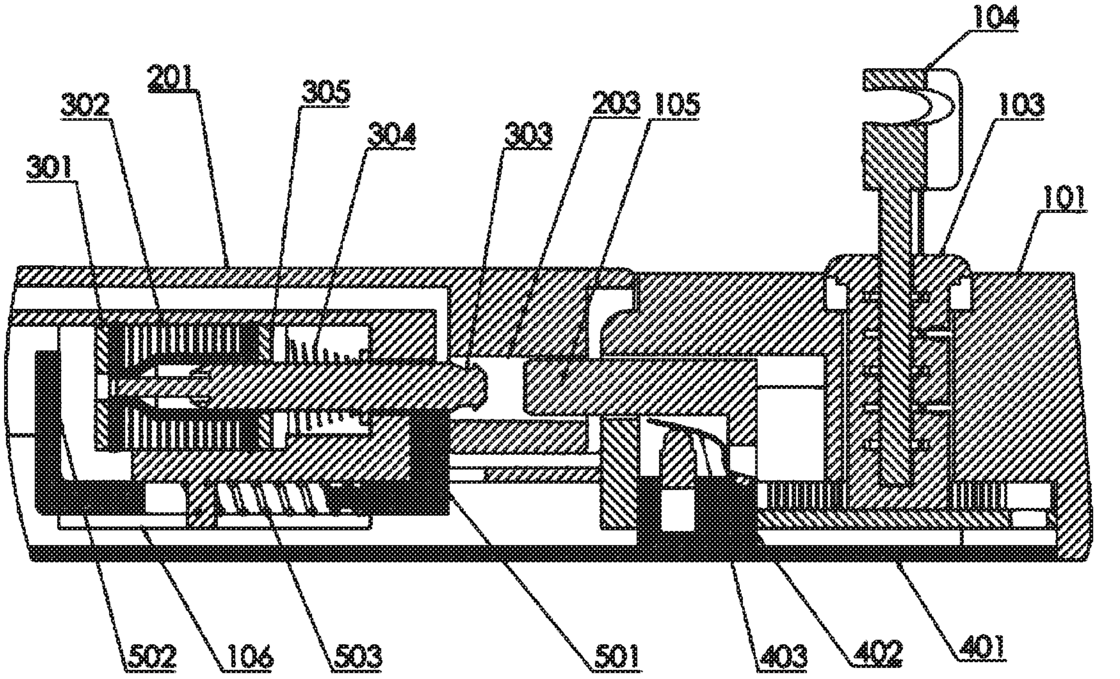
FIG. 10 is an enlarged schematic diagram of Part A when the iron core is stuck into the snap hole after the sensor switch is released.
Figure 11:
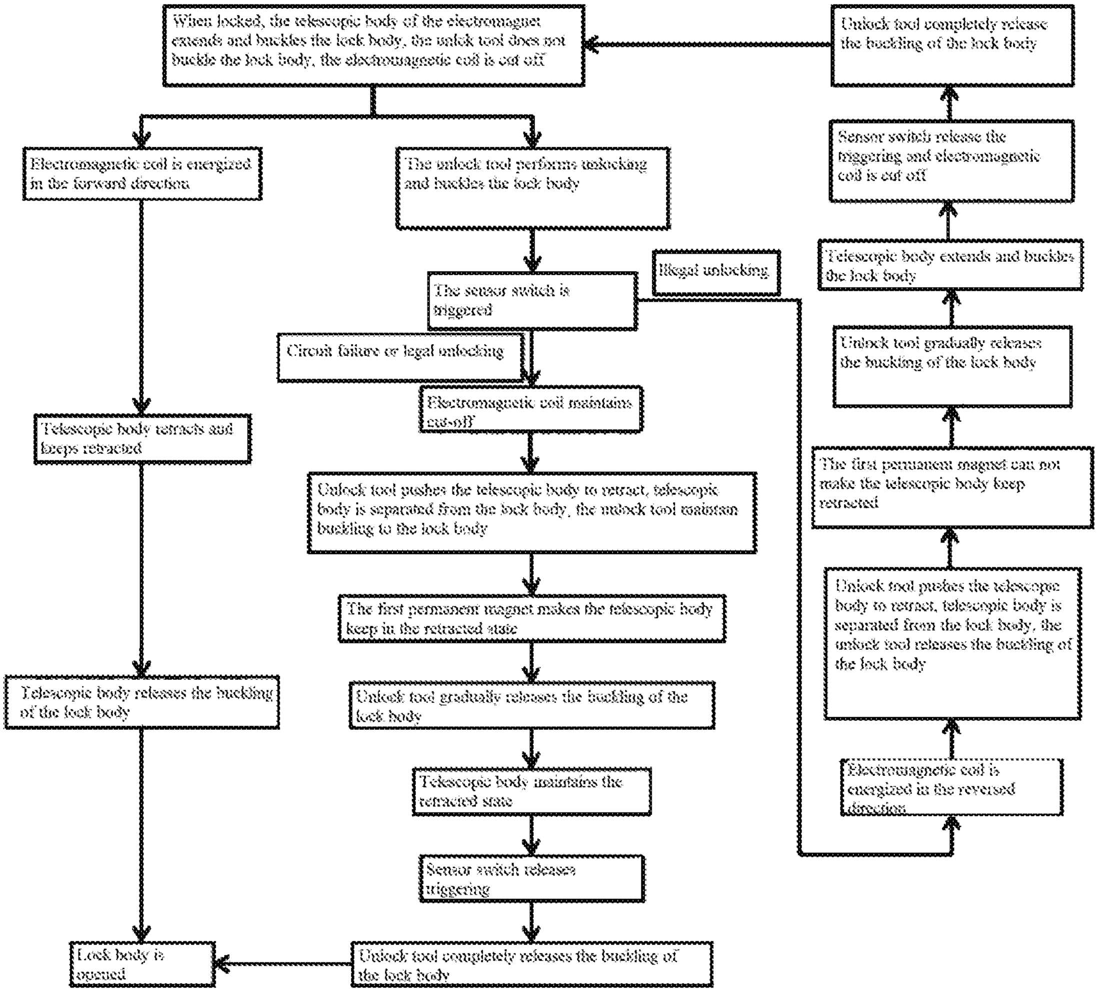
FIG. 11 is a schematic flow diagram of a control method of an electronic lock.
Figure 12:
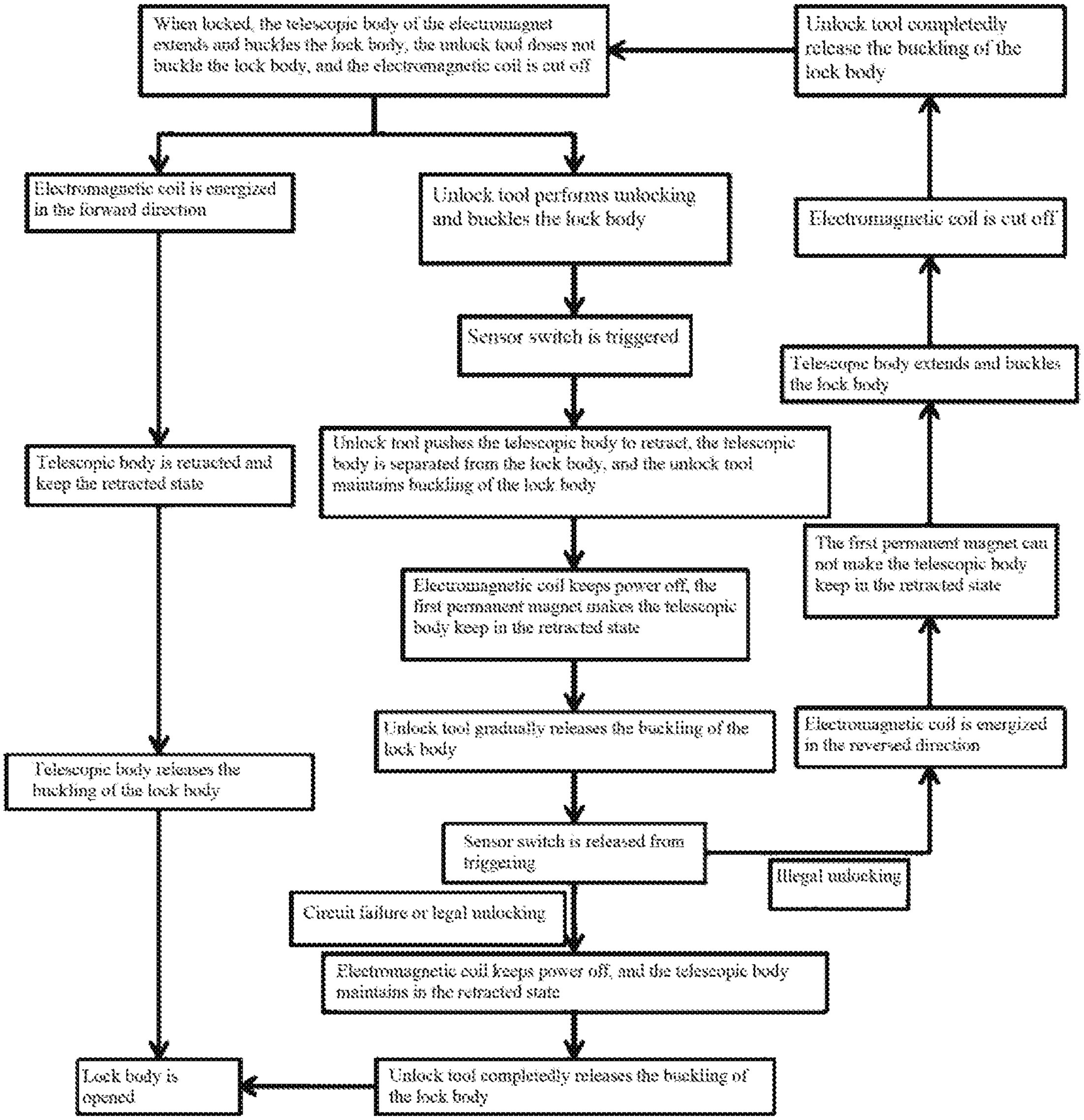
FIG. 12 is a schematic flow diagram of another control method of the electronic lock.

FIGS. 1 and 10 show schematic diagrams of a lock used in industrial occasions; FIG. 1 is a schematic diagram of the explosive structure of the lock. FIG. 2 is a schematic diagram of the overall structure of the lock when it is locked. FIG. 3 is a schematic diagram of the lock when the handle 201 is opened. FIG. 4 is a schematic diagram of the internal structure of the lock when it is locked. FIGS. 5 to 10 is enlarged schematic diagrams of the structure of Part A in FIG. 4 in various states of the lock. FIGS. 11 and 12 are schematic flow diagrams of the two control methods of the electronic lock.

It can be seen that the lock may include a lock body base 101 and a handle 201 fixedly connected to the gear shaft 107 at the rear end of the lock body base 101 through a connecting shaft 202. The handle 201 can be rotated based on the connecting shaft 202, and can drive the gear movable block 108 to move up and down through the gear shaft 107. The electromagnet, the reset tongue 501 and the reset spring 503 may be installed in the lock body base 101 through the fix frame 106. The unlock mechanism composed of the lock cylinder 103 and the push rod 105 located at the rear end of the lock cylinder 103 and capable of moving up and down under its control may be installed in the lock cylinder hole 102 of the lower end of the lock body base 101. A key 104 inserted into the lock cylinder 103 can drive the lock cylinder 103 to rotate to unlock. A control circuit board 401 with a sensor switch 402 may be installed in the lock body base 101. The sensor switch 402 may have a contact spring 403 for sensing the movement of the push rod 105.

It can be understood that in this set of exemplary figures, one end of the handle 201 may be fixedly connected to the lock body base 101 through a connecting shaft 202 and a gear shaft 107 at the rear end of the lock body base 101, and can rotate relative to the lock body base 101 based on the connecting shaft 202. The lock may be connected to the gear movable block 108 through the gear shaft 107, so that by turning the handle 201 to rotate the gear shaft 107 to drive the gear movable block 108 to move up and down to realize the opening of the cabinet door, this may be also a common feature of this type of lock. While in more occasions, the handle 201 can be can be completely independent from the lock body base 101, and even the handle 201 may be simplified to be a structural member with only similar functions as the snap hole 203 directly installed on the door frame or cabinet door or directly made on the door frame or door panel, for example the handle 201 and the lock body base 101 may be separately installed on the cabinet door and on the door frame, and can be opened/closed by opening/closing the door and the door frame. All these should be regarded as the protection scope of this disclosure.

It can be understood that, as shown in the group of exemplary figures, the manner that the lock cylinder 103 is rotated by a key 104, and the rear end of the lock cylinder 103 drives the push rod 105 to move up and down driven by a gear can be adopted. The lock cylinder 103 and key used can be a mechanical lock cylinder 103 and a mechanical key, or can also be an electronic lock cylinder 103 and an electronic key. In practical applications, buttons or knobs can also be used to replace the lock cylinder 103; The manner that the push rod 105 is driven to move up and down by pushing/pulling out the button or rotating the knob can be adopted. It can be understood that in this exemplary figures, the push rod 105 can move up and down under the control of the gear at the rear end of the lock cylinder 103. In actual applications, the unlock mechanism and the push rod 105 controlled by it can also be realized in other ways, for example, a key hole can be opened under the lock body base 101, the key 104 can be inserted directly into the key hole, the key can be inserted into the lower end of the snap hole 203 to realize the function of a push rod 105. All these should be regarded as the protection scope of this disclosure.

It can be understood that in this set of example figures, an electromagnetic coil 302, an electromagnet frame 301, a first permanent magnet 305 located in the electromagnet frame 301, a telescopic body movable hole composed of a through hole of the electromagnetic coil 302, a telescopic body composed of an iron core 303 in the through hole, and an electromagnet with a power-off self-holding function composed of a force applying structure composed of an iron core spring 304 located between the electromagnet frame 301 and the iron core 303 may be adopted. For ease of description, it may be defined that when the electromagnetic coil 302 of the electromagnet is energized in the forward direction, the electromagnetic coil 302 generates magnetic attraction to attract the iron core 303 to retract, and at the same time the iron core spring 304 is compressed; and after the power is off, the first permanent magnet 305 absorbs the iron core 303 and makes it maintain the retracted state; and when the electromagnetic coil 302 is energized in the reverse direction, the magnetic attraction generated by the electromagnetic coil 302 repels the first permanent magnet 305, and the iron core 303 is stretched out due to the action of the compressed iron core spring 304 and cannot maintain the retracted state, after power is off, the extended state is still maintained. The electromagnet with this kind of function may have other construction methods. For example, the first permanent magnet 305 is located in the iron core 303, by using the magnetic attraction generated by the first permanent magnet 305 and the electromagnet frame 301 themselves and the magnetic attraction or the magnetic repulsion generated by the electromagnetic coil 302 in the energized state to the first permanent magnet 305, the iron core 303 can be extended or retracted and the state can be maintained. Alternatively, the iron core 303 may include a force applying structure composed of a second permanent magnet, and this function can also be realized by using the functions of the second permanent magnet and the first permanent magnet 305 in the iron core 303. The differences in the structure and function of the electromagnet should be regarded as the protection scope of the present disclosure.

Similarly, it can be understood that the first permanent magnet 305 can also be independently located in the lock body base 101 to perform the same function of "maintaining the retracted state when the telescopic body is retracted" as the first permanent magnet 305 located in the electromagnet. All these should be regarded as the protection scope of the present disclosure.

Figure 5:
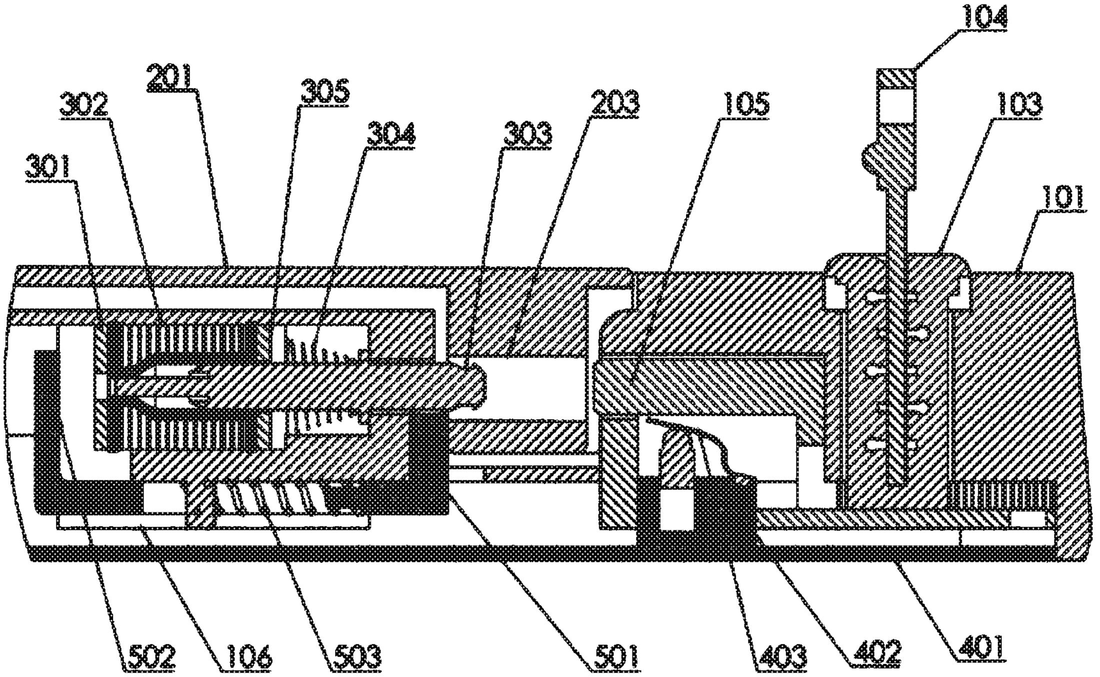
FIG. 5 is an enlarged schematic diagram of Part A in FIG. 4.
Figure 6:
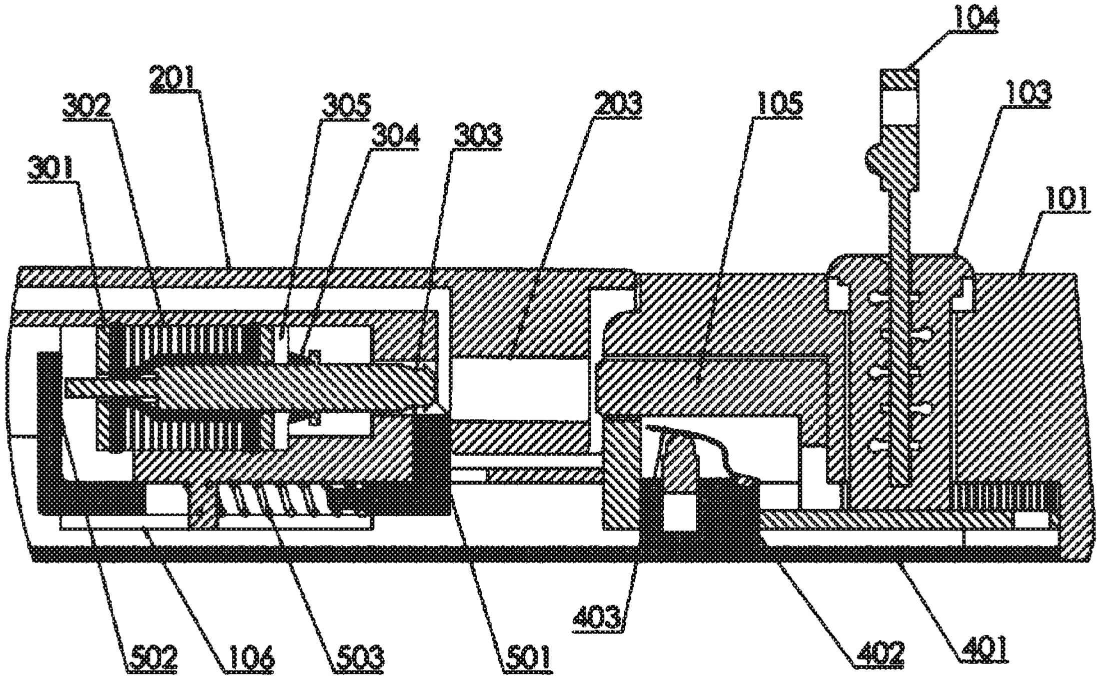
FIG. 6 is an enlarged schematic diagram of Part A when the lock is automatically opened.

It can be understood that the handle 201 may have a snap hole 203 for cooperating with the iron core 303 and the push rod 105. The snap hole 203 may be an integral through hole; when the handle 201 is closed in the lock body base 101, the telescopic body in the extended state can snap into the upper end of the snap hole 203, and the push rod 105 located at the lower end of the snap hole 203 will not enter the snap hole 203, as shown in FIG. 4 and FIG. 5.

It can be understood that when the push rod 105 is located outside the snap hole 203 and the electromagnet is energized in the forward direction, the iron core 303 can be moved upward and retracted. At this time, the iron core 303 may be separated from the snap hole 203, and the handle 201 can be opened outwards with the shaft as the axis from the lock body base 101, so as to realize the automatic opening of the electronic lock. The relevant structural diagrams may be shown in FIG. 3 and FIG. 6. In order to overcome the accidental opening of the lock body when it encounters accidental vibration, etc., the necessary buckle structure may be added at the position where the lower end of the iron core 303 and the upper end of the snap hole 203 cooperate, which can better solve the above accidental opening. When the iron core 303 needs to move upwards, the buckle structure can be separated by lightly pressing the handle 201, so that the iron core 303 can move upwards smoothly. All these should be regarded as the protection scope of this disclosure.

Figure 7:
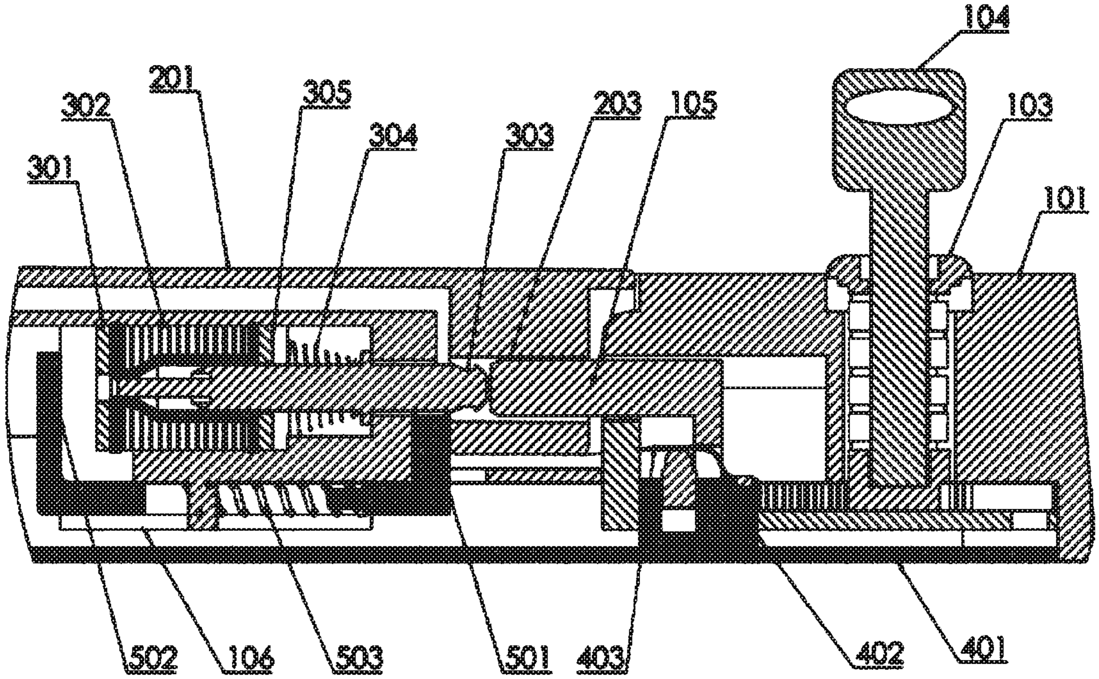
FIG. 7 is an enlarged schematic diagram of Part A when the key is inserted into the lock cylinder and the push rod is pushed upward.

It can be understood that in this set of example figures, when the key 104 is used to unlock the lock cylinder 103, the push rod 105 may move upwards under the control of the lock cylinder 103 and enter the snap hole 203 from bottom to top. The upward movement of the push rod 105 will touch the contact spring 403 to trigger the sensor switch 402, the push rod 105 may control the handle 201 to be unable to open, as shown in FIG. 7. With the upward movement of the push rod 105, when the upper end of the push rod 105 contacts the iron core 303, the push rod 105 that continues to move upward will push the iron core 303 upward together, thus the iron core 303 may be retracted relative to the electromagnetic coil 302, and the iron core spring 304 may be compressed, as shown in FIG. 8. At this time, the push rod 105 may still trigger the contact spring 403. when the push rod 105 moves downward with the control of the lock cylinder 103, it will finally be separated from the snap hole 203 follow as the push rod 105 moves downward, if the iron core 303 remains retracted at this time, both the iron core 303 and push rod 105 may be separated from the snap hole 203, and the handle 201 can be opened from the lock body base 101, the related structure diagram may be shown in FIG. 6. If the electromagnetic coil 302 is energized in the reverse direction before the push rod 105 moves down and detaches from the snap hole 203, the iron core 303 cannot be kept retracted, so that the iron core spring 304 will make the iron core 303 stick out and enter the snap hole 203, as shown in FIG. 7 and FIG. 10. Even if the push rod 105 continues to move downward and detach from the snap hole 203, because the iron core 303 may be still in the snap hole 203, the handle 201 still cannot be opened from the lock body base 101, and the relevant structure diagrams may be shown in FIG. 4 and FIG. 5.

It can be understood that, in this solution, the snap hole 203 can also be divided into an upper snap hole matched with the iron core 303 and a lower snap hole matched with the push rod 105. When the iron core 303 is extended downward, it may be snapped into the upper snap hole; when the push rod 105 moves upward, it may be snapped into the lower snap hole. The upper snap hole and the lower snap hole may be communicated or not communicated at all. After the push rod 105 moves upward, it may retract the iron core 303 through other mechanical structures outside the lower snap hole. Depending on the structure of the snap hole 203 and iron core 303, the corresponding push rod 105 and iron core structure can also be different, but their core function "the push rod 105 is controlled by the unlock mechanism to move up and down", and the basic function "when the push rod 105 in the extended state is located in and moves upwards in the snap hole 203, it can push the telescopic body upwards" will not change. All these should be regarded as the protection scope of this disclosure.

It can be understood that in this solution, when the electronic lock is locked, the lower end of the iron core 303 in the extended state may be clamped into the snap hole 203, thereby controlling the handle 201. In practical applications, blocks with different mechanical structures can also be connected to the lower end of the iron core 303, the handle 201 can be controlled through the block and the snap hole 203 on the handle 201 or the clamping groove with similar structure. While there may be many types of mechanical structures that the block is pushed by the push rod 105 to drive the iron core 303 to retract, and there may be no change in the fundamental functions between the handle 201 and the push rod 105. All these should be regarded as the protection scope of this disclosure.

It can be understood that in this set of schematic diagrams, in the process of preventing illegal unlocking with a key 104, it may be only necessary to prevent the iron core 303 from being retracted and extend into the snap hole 203 when the push rod 105 remains in the snap hole 203. If the power consumption of the electronic lock is not considered when illegal unlocked by the key 104, as shown in FIG. 7, when the push rod 105 moves upward and the sensor switch 402 is triggered, the electromagnetic coil 302 may start and remain to be energized in the reverse direction. At this time, the push rod 105 may continue to move upward, then the iron core 303 may be pushed up and retracted, as shown in FIG. 8. But the iron core 303 cannot maintain the retracted state, and as the push rod 105 moves downward, the iron core 303 will move downward together and continue to be locked into the snap hole 203, as shown in FIG. 7. While the push rod 105 continues to move downwards to release the trigger state of the sensor switch 402, the electromagnetic coil 302 may be cut off, and the iron core 303 may be still in the snap hole 203, as shown in FIG. 10. When the push rod 105 exits the snap hole 203, the handle 201 cannot be opened. During the whole process, as long as the key 104 drives the lock cylinder 103 to move the push rod 105 and trigger the sensor switch 402, the electromagnetic coil 302 needs to be energized in the reverse direction and maintained, and continues until the sensor switch 402 is released from the trigger state, that is, the push rod 105 returns to its original state. The flow chart of the control method of the electronic lock may be shown in FIG. 11.

It can be understood that in the above solution, if it may be necessary to further consider how to reduce the power consumption of the electronic lock when illegal unlocked by the key 104, then it may be necessary to consider how to further reduce the problem of how to control the electromagnetic coil 302 power supply when illegal unlocked by the key 104. A control method of an electronic lock that may be further optimized under the above technical conditions, as shown in FIG. 12, it is the flow chart of the control method. After the push rod 105 moves up and enters the snap hole 203, the push rod 105 may continue to rise and trigger the sensor switch 402, at this time, the electromagnetic coil 302 may be temporarily not energized, as shown in FIG. 7. While the push rod 105 continues to move upward and push the iron core 303 upwards together and make the iron core 303 exit the snap hole 203, the iron core 303 may retract relative to the electromagnetic coil 302, as shown in FIG. 8. When the push rod 105 is controlled by the lock cylinder 103 and starts to move downwards, the electromagnetic coil 302 may still remain power-offed, and the iron core 303 may remain retracted, as shown in FIG. 9. When the push rod 105 continues to move downward in the snap hole 203 and at the moment when the sensor switch 402 is released, the push rod 105 may be still located in the snap hole 203. At this time, when the electromagnetic coil 302 is energized in the reverse direction, the iron core 303 in the retracted state may extend downward and snap into the snap hole 203. As shown in FIG. 10, the electromagnetic coil 302 can be de-energized after that. When the electromagnetic coil 302 is energized and the iron core 303 is stuck in the snap hole 203, the push rod 105 that continues to move downward may be still located in the snap hole 203; and when the push rod 105 continues moving downwards and exiting the snap hole 203, the iron core 303 may remain coupled in the snap hole 203, thereby controlling the handle 201. The relevant structural diagrams may be shown in FIG. 4 and FIG. 5. In this way, only after the push rod 105 moves down to a certain position in the snap hole 203, the electromagnetic coil 302 may be instantly energized to achieve the above functions, which greatly reduces the problem that the power consumption of the electronic lock when the key 104 is inserted into the lock cylinder 103 to unlock. In order to better realize the above functions, it may be necessary to lengthen the length of the snap hole 203 to increase the distance of the push rod 105 moving in the snap hole 203, so in the process that the push rod 105 moves downward and the sensor switch 402 is deactivated until the push rod 105 of completely exiting the snap hole 203, there may be enough time for the control system of the electronic lock to react, and the electromagnetic coil 302 may be energized and the iron core 303 can be extended and stuck into the snap hole 203. All these should be regarded as the protection scope of this disclosure.

It can be understood that in this set of exemplary figures, a reset tongue 501 and a reset spring 503 may be also installed in the lock body base 101. The lower end of the reset tongue 501 may abut against the outer wall of the snap hole 203 of the handle 201 when the handle 201 is closed in the lock body base 101, and can make the reset spring 503 in a compressed state, as shown in FIG. 4. When the iron core 303 is retracted, the ejector rod at the upper end of the iron core 303 may extend from the upper end of the through hole of the electromagnetic coil 302 and may be not affected by the reset rod at the upper end of the reset tongue 501. When the handle 201 is opened from the lock body base 101, the reset tongue 501 may lose the support of the handle 201 and can move downward under the action of the reset spring 503. The reset rod may push the iron core 303 to move downward, so that the iron core 303 can extend downward, as shown in FIG. 3. It can be understood that the reset tongue 501 structure with this type of function can have many forms, for example, the reset tongue 501 may directly abut on the inner wall of the handle 201, and after the handle 201 is separated from the lock body base 101, the reset spring 503 may push the reset tongue 501 to move, so as to achieve the purpose of extending the iron core 303 in the retracted state through the reset tongue 501. It can be understood that through the different structures of the iron core 303, combined with the different structures of the reset tongue 501, this purpose can also be achieved. For example, when the reset tongue 501 directly moves downwards, it can directly push the snap ring outside the electromagnetic coil 302 at the lower end of the iron core 303, the purpose can be also achieved. For different processing methods, the structures of the reset tongue 501 and the reset spring 503 themselves can be changed, but their core function may be still "when the telescopic body is in a high position and the handle 201 is separated from the lock body base 101, the reset spring 503 pushes the reset tongue 501 to make the telescopic body move downward". All these should be regarded as the protection scope of this disclosure.

It can be understood that in this solution, the sensor switch 402 may be a light-touch switch with a contact spring 403, and the switch may be triggered by triggering the contact spring 403, so that the electrical signal output by the switch changes. In practical applications, the sensor switch 402 can also be an electromagnetic sensor switch, or a contact switch, or a light-sensitive sensor switch, or a micro switch. It can also be a sensor switch set composed of a plurality of sensor switches, or even a plurality of sensor switches of different types, which may be convenient for more precise sensing the position of the push rod 105 and the status of the push rod 105 moving upwards or downwards. The sensor action performed by the sensor switch 402 to the unlock mechanism for unlocking operations can be that the sensor switch 402 is triggered to send an electrical signal to the electronic lock control system, or that the switch is restored from the triggered state to the non-triggered state so that the electronic lock control system loses the electrical signal. All these should be regarded as the protection scope of this disclosure.

It can be understood that, in this solution, an sensor switch may be adopted to sense the movement of the push rod 105, but in fact, one or more sensor switches can be used to sense the unlocking operation by the unlock mechanism. The one or more sensor switches may sense the upward/downward movement of the push rod 105, or sense upward/downward movement of the telescopic body, or sense the upward/downward movement of the reset tongue 501 by the unlock mechanism or push rod 105, or sense the actions including insertion of the unlocking key, rotating the lock cylinder 103 or knob on the handle 201, or pressing the button. Alternatively, the one or more sensor switches may be used to sense the unlocking operation by the unlock mechanism, which refers to that the upward movement of the push rod 105 or the upward movement of the reset tongue 501 can cause one or more sensor switches to be triggered, when the push rod 105 or the reset tongue 501 moves down, one or more of the sensor switches may be triggered to return to the state when it is not triggered; or it refers to that after the upward movement of the push rod 105 or the upward movement of the reset tongue 501 makes one or more sensor switches untriggered, one or more of the sensor switches may be triggered when the push rod 105 or reset tongue 501 moves downward. All these should be regarded as the protection scope of this disclosure.

It can be understood that, in this set of exemplary figures, the sensor switch 402 may be installed on the circuit board, and the circuit board may be installed in the lock body base 101. When the sensor switch 402 is triggered/untriggered after obtaining the unlock mechanism to perform the unlock action, it will enable the control circuit board 401 to obtain relevant electrical signals, so that the control circuit board 401 can determine whether the unlock action of the unlock mechanism is illegal. If it is determined to be an illegal unlock action, the electromagnetic coil 302 will be energized in the reverse direction or kept reversely energized. If it is determined as a legal unlock action (network interruption, or equipment failure, or obtaining a legal unlocking authorization, etc.), the electromagnetic coil 302 may be energized or cut off. And if the circuit board itself has an electrical failure (including the failure of the sensor switch 402), the electromagnetic coil 302 will not be energized in the reverse direction or remain reverse energized, and the lock can still be unlocked by the unlock mechanism. In practical applications, the sensor switch 402 can also be separately installed in the lock body base 101 as required, and then electrically connected to the circuit board, and the circuit board can also be installed outside the lock body base 101 as required. In this regard, the specific installation position of the sensor switch 402 and the installation position of the circuit board should be regarded as the protection scope of the present disclosure.

It can be understood that in this embodiment, in order to further enhance the mechanical strength of the electronic lock when it is locked, a block can be added to the end of the iron core 303, so that the block may replace the iron core 303 to buckle the snap hole 203. When the push rod 105 moves upward, the iron core 303 may be driven to move upward together by pushing the block, so that the above technical solution can also be realized. All these should be regarded as the protection scope of this disclosure.

The control method of an electronic lock and the electronic lock based on the control method of the present disclosure have a simple structure. The telescopic body of the electromagnet located on the lock body base 101 and the push rod 105 controlled by the unlock mechanism jointly control the snap hole 203 on the handle 201. The first permanent magnet 305 may be used to make the telescopic body of the electromagnet have the characteristics of self-holding function when power off, which not only solves the automatic unlocking function that electronic locks need to have, but also solves the hidden danger of illegal unlocking through mechanical structures. It can greatly reduce the power consumption of electronic locks when preventing illegal unlocking, and can meet the market's technical requirements for electronic locks, and has high promotion value.

However, the above are only preferred and feasible embodiments of the present disclosure, and do not limit the scope of protection of the present disclosure. Therefore, all equivalent structural modifications made by using the concepts of the specification and drawings of the present disclosure are included within the range in the protection of the present disclosure.

INDUSTRIAL APPLICABILITY

The control method of the electronic lock and the electronic lock based on the control method of the present disclosure have a simple and reliable electronic lock structure. The unlock tool, the electromagnet and the first permanent magnet are used cleverly, and the unlock tool and the telescopic body of the electromagnet are used together to control the snap hole of the lock body, which realizes automatic unlocking and preventing illegal unlocking. At the same time it can meet the purpose of unlocking the lock through the unlock mechanism when any electronic failure occurs; and through the unique control method, the low power consumption of the electronic lock can be further realized. It has high application value in the application of electronic locks.

What is claimed is:

1. A control method of electronic lock, the electronic lock comprising a lock body, an unlock tool, an electromagnet located in the lock body, and a first permanent magnet further located in the lock body; wherein: the electromagnet comprising an electromagnetic coil, a telescopic body and a force applying structure; the telescopic body or the force applying structure being driven to drive the telescopic body to perform retraction movements when the electromagnetic coil is energized in a forward direction; when the electromagnetic coil is energized in a reverse direction, the telescopic body being driven or driven jointly with the force applying structure to perform extension movements;

when in an initial state, the electromagnet being in a power-off state or a reverse energization state, and being extended and held by the telescopic body of the electromagnet, and the lock body being clamped by the telescopic body or being clamped by a extended block connected to the telescopic body of the electromagnet, such that the lock body cannot be opened, and the electronic lock is in a locked state;

when the electronic lock obtains an unlock instruction and needs to be automatically opened, forward power being supplied to the electromagnet to retract the telescopic body; the lock body being released from a locking state by the telescopic body or the extended block in a retracted state, such that the lock body is opened and the electronic lock is automatically opened;

when an unlock action is performed by the unlock tool, the unlock tool first coupling to the lock body so that the lock body cannot be opened, then the unlock action is continued, the unlock tool pushing the telescopic body or the extended block to retract, and the lock body being released from the locking state by the telescopic body or the extended block; during this process, the unlock tool remaining coupled to the lock body, and the lock body still cannot be opened; Step A, or B, or C being performed as follows;

Step A: when the electronic lock has an electronic failure or the electronic lock obtains the unlock instruction, or the electronic lock obtains a release instruction releasing an unlocking from an anti-unlock tool, so that the electromagnet is in or remains in the power-off state, the first permanent magnet absorbing the telescopic body or the extended block in the retracted state; when the unlock tool further performs unlocking or reverse unlocking, the locking state of the lock body is gradually released, the telescopic body still remaining retracted; when the unlock tool completely unlocks the lock body, the lock body opening and the electronic lock being unlocked with the unlock tool;

Step B: when the electronic lock senses that the unlock action by the unlock tool is illegal, the electromagnet being supplied with reverse power, so that the first permanent magnet cannot absorb the telescopic body or the extended block in the retracted state; when the unlock tool performs further unlock action or reverse unlock action, and gradually releases a coupled state of the lock body, the telescopic body extending and blocking the lock body with an action of the electromagnet, or the telescopic body following the action of the electromagnet and extending to clamp the lock body with the extended block connected to the telescopic body; Step C being executed as follows;

Step C: when the electronic lock senses that the unlock action by the unlock tool is illegal; when the unlock tool further performs the unlock action, or performs the reverse unlock action, the coupled state of the lock body being gradually released, the unlock tool being separate with the telescopic body or the extended block; when the unlock tool has not completely released the coupled state of the lock body, reverse power being supplied to the electromagnet, such that the first permanent magnet cannot absorb the telescopic body or the extended block in the retracted state; the telescopic body extending with the action of the electromagnet and clamping the lock body, or the telescopic body extending with the action of the electromagnet and clamping the lock body with the extended block connected to the telescopic body; the following step D being executed;

Step D: when the unlock tool completely releases the coupled state of the lock body, the lock body being still clamped by the telescopic body, the lock body cannot be opened, and the electronic lock preventing illegal unlocking by the unlock tool.

2. The control method of electronic lock according to claim 1, wherein the unlock tool comprises a key, or a lock cylinder, or a knob, or a button, or a combination of a corresponding mechanical structure and the key or the lock cylinder or the knob or the button;

that when an unlock action is performed by the unlock tool, the unlock tool first coupling to the lock body so that the lock body cannot be opened refers to that when the unlock action is performed by the key, or the lock cylinder, or the knob, or the button, or the combination of the corresponding mechanical structure and the key or the lock cylinder or the knob or the button, the key, the lock cylinder, the knob, or the button, or the combination of the corresponding mechanical structure and the key or the lock cylinder or the knob or the button couples the lock body first, so that the lock body cannot be opened;

that then the unlock action is continued, the unlock tool pushing the telescopic body or the extended block to retract refers to that when the unlock action is performed by the key, or the lock cylinder, or the knob, or the button, or the combination of the corresponding mechanical structure and the key or the lock cylinder or the knob or the button, a movement of the key, the lock cylinder, the knob, or the button, or the combination of the corresponding mechanical structure and the key or the lock cylinder or the knob or the button pushes the telescopic body or the extended block to retract;

that when the unlock tool further performs the unlock action, or performs the reverse unlock action, the coupled state of the lock body being gradually released refers to that when through the further unlock action, or the reverse unlock action, the movement of the key, or the lock cylinder, or the knob, or the button, or the combination of the corresponding mechanical structure and the key or the lock cylinder or the knob or the button gradually releases the coupled state of the lock body.

3. The control method of electronic lock according to claim 2, wherein the force applying structure is a telescopic body spring or a second permanent magnet;

that the telescopic body is connected to the force applying structure body is that the telescopic body is connected to the telescopic body spring; when the telescopic body is in the retracted state, the telescopic body spring exerts a downward force on the telescopic body, and, the telescopic body is composed of a material that can be absorbed by magnetic force; or that the telescopic body is connected to the force applying structure body is that the telescopic body is mounted with the second permanent magnet, the second permanent magnet repels a magnetism of the first permanent magnet when the telescopic body is in an extended state, and keeps the telescopic body in the extended state; when the telescopic body moves upward to the retracted state, the second permanent magnet generates a magnetic attraction with the first permanent magnet with a displacement relative to the first permanent magnet, so as to maintain the telescopic body in a retracted state.

4. An electronic lock based on the control method of electronic lock according to claim 3, wherein the electronic lock comprising a lock body composed of a lock body base and a handle, an unlock tool, an electromagnet and a first permanent magnet installed in the lock body base; the unlock tool comprising an unlock mechanism composed of a key, or a lock cylinder, or a knob, or a button, and a corresponding mechanical structure composed of a push rod;

the electromagnet comprising an electromagnetic coil, a telescopic body, and a force applying structure; the telescopic body being placed in a telescopic body movable hole of the electromagnetic coil; the handle having a snap hole, the snap hole being an integral through hole, or being divided into an upper snap hole matched with the telescopic body and a lower snap hole matched with the push rod;

when the electronic lock is closed on the lock body base, the unlock action is performed by the unlock tool, the movement of the unlock mechanism driving the push rod to move up or down, and the handle being coupled by the push rod, so that the handle cannot be opened; the electromagnet, the unlock mechanism, and the push rod that moves under a control of the unlock mechanism being installed in the lock body base; the push rod being controlled by the unlock mechanism to be able to move in a telescopic direction of the telescopic body; when the push rod moves relatively close in the telescopic direction of the telescopic body, the telescopic body in an extended state being pushed to the retracted state; when the telescopic body in the extended state or the push rod in the extended state is located in the snap hole of a corresponding position on the handle, the handle being in a closed state;

when the telescopic body and the push rod in the retracted state are both completely separate from the snap hole, the handle being in the open state;

the first permanent magnet being installed in the lock body base or in the electromagnet for keeping the telescopic body in retracted state when the telescopic body is retracted; the force applying structure applying force to the telescopic body and maintaining the telescopic body in extended state when the telescopic body is extended.

5. The electronic lock according to claim 4, wherein a lower end of the telescopic body is connected with a block; that when the telescopic body in the extended state or the push rod in the extended state is located in the snap hole of a corresponding position on the handle, the handle being in the closed state refers to that when the telescopic body in the extended state drives the block to extend, and then the block is stuck in the snap hole, the handle is in the closed state; that when the telescopic body and the push rod in the retracted state are both completely separate from the snap hole, the handle being in the open state refers to that when the telescopic body in the retracted state drives the block to be retracted, and the push rod is also simultaneously separate from the snap hole, the handle is in the open state.

6. The electronic lock according to claim 4, wherein the electronic lock further comprises a reset tongue and a reset spring installed on the lock body base; when the handle is closed in the lock body base, a lower end of the reset tongue abuts on an inner wall of the handle or abuts an outer wall of the snap hole, and the reset spring between the reset tongue and the lock body base is compressed or stretched; the reset tongue cooperates with the telescopic body, when the telescopic body is retracted and the handle is separate from the lock body base, the reset spring pushes the reset tongue to move the telescopic body downward.

7. The electronic lock according to claim 6, wherein the reset tongue cooperates with the telescopic body, that when the telescopic body is in a high position and the handle is separated from the lock body base, the reset spring pushes the reset tongue to move the telescopic body downward refers to that the telescopic body movable hole is a through hole, an upper end of the telescopic body is connected with an ejector rod, when the telescopic body is retracted, the ejector rod passes out through the upper end of the telescopic body movable hole, and the handle is closed in the lock body base, the reset tongue does not affect a movement of the telescopic body; when the handle is separated from the lock body base, the reset tongue moves downward under a push of the reset spring, and pushes the ejector rod of the telescopic body in the retracted state to move the telescopic body downward together, and the telescopic body extends; or when the handle is closed in the lock body base, a part of the telescopic body outside the telescopic body movable hole of the electromagnetic coil is not affected by the reset tongue when the telescopic body is retracted; when the handle is separated from the lock body base, the reset tongue moves downward under the push of the reset spring, and pushes the part of the telescopic body outside the telescopic body movable hole to move downward together, and the telescopic body extends.

8. The electronic lock according to claim 6, wherein the electronic lock further comprises at least one sensor switch installed in the lock body base for sensing an unlocking operation with the unlock tool, the sensor switch is a touch switch, or an electromagnetic sensor switch, or a contact switch, or a light-sensitive sensor switch, or a micro switch, or a combination of the above-mentioned various switches;

the at least one sensor switch is used for sensing the unlocking operation with the unlock tool refers to that the one or more sensor switches sense an upward or downward movement of the push rod, or sense the upward or downward movement of the telescopic body, or sense the upward or downward movement of the reset tongue by the unlock tool or the push rod, or sense action that occurs when the unlocking key is inserted, the lock cylinder or the knob on the handle rotates, or sense the action that occurs when the button is pressed; or that the at least one sensor switch is used to sense the unlocking operation with the unlock tool refers to the upward movement of the push rod or the upward movement of the reset tongue to cause one or more of the sensor switches to be triggered, and the downward movement of the push rod or the reset tongue causes one or more of the sensor switches to return to an untriggered state from a triggered state; or refers to a state where the upward movement of the push rod or the upward movement of the reset tongue causes one or more sensor switches to be untriggered, one or more sensor switches are triggered due to downward movement of the push rod or the reset tongue.

9. The electronic lock according to claim 7, wherein the electronic lock further comprises a control circuit board; the control circuit board is connected to the electromagnetic coil and is responsible for supplying power to the electromagnetic coil in a forward or reverse direction; the control circuit board is connected to the sensor switch and is responsible for receiving the induction signal of the sensor switch; when the unlock tool performs an unlock action to trigger or untrigger the sensor switch, the control circuit board determines whether the unlock tool is an illegal unlock action, when the illegal unlock action is determined, the electromagnetic coil is energized in the reverse direction or maintains reverse energization; when a legal unlock action is determined, the electromagnetic coil is energized forward or de-energized.

10. The electronic lock according to claim 4, wherein the handle is movably connected with the lock body base at one end, the snap hole is located at an other end of the handle, and the handle is opened about a connection with the lock body base as the axis; or the handle is completely separated from the lock body base.

11. The electronic lock according to claim 4, wherein the unlock tool is installed in the lock body base.

12. The electronic lock according to claim 4, wherein the upper snap hole matched with the telescopic body and the lower snap hole matched with the push rod are configured to: make the telescopic body coupled into the upper snap hole when extends downward; make the push rod coupled into the lower snap hole when moves upward; or make telescopic body retracted by other mechanical structures itself outside the lower snap hole after the push rod moves upward.

13. The electronic lock according to claim 4, wherein a position where a lower end of the telescopic body and an upper end of the snap hole cooperate with each other has a coupled structure.

14. The electronic lock according to claim 4, wherein the electromagnet further comprises an electromagnet frame, wherein the first permanent magnet is located in the electromagnet frame, and the telescopic body movable hole is composed of conductive hole of the electromagnetic coil, wherein the telescopic body is composed of an iron core in the conductive hole, and the force applying structure is located between the electromagnet frame and the iron core and is composed of an iron core spring.

* * * * *